US012707203B2

(12) United States Patent
Rao et al.

(10) Patent No.: US 12,707,203 B2
(45) Date of Patent: Aug. 11, 2026

(54) ELECTRONIC DEVICE

(71) Applicant: MERRY ELECTRONICS (SUZHOU) CO., LTD., Jiangsu Province (CN)

(72) Inventors: LiGuo Rao, Jiangsu Province (CN); ChunLong Zheng, Jiangsu Province (CN); MingYa Luo, Jiangsu Province (CN); Huaming Wan, Jiangsu Province (CN)

(73) Assignee: MERRY ELECTRONICS (SUZHOU) CO., LTD., Jiangsu Province (CN)

( * ) Notice: Subject to any disclaimer, the term of this patent is extended or adjusted under 35 U.S.C. 154(b) by 162 days.

(21) Appl. No.: 18/927,318

(22) Filed: Oct. 25, 2024

(65) Prior Publication Data

US 2026/0040010 A1 Feb. 5, 2026

(30) Foreign Application Priority Data

Aug. 1, 2024 (CN) ......................... 202411046517.4

(51) Int. Cl.
*H04R 9/02* (2006.01)
*H02K 33/18* (2006.01)
(Continued)

(52) U.S. Cl.
CPC ............. *H04R 9/025* (2013.01); *H02K 33/18* (2013.01); *H04R 1/2873* (2013.01); *H04R 9/046* (2013.01);
(Continued)

(58) Field of Classification Search
CPC ...... H04R 9/025; H04R 1/2873; H04R 9/063; H04R 2400/03; H04R 9/06
(Continued)

(56) References Cited

U.S. PATENT DOCUMENTS

2014/0082929 A1* 3/2014 Aono ................. G11B 33/1446
29/603.03
2021/0149157 A1* 5/2021 Kim ....................... H04N 23/57

FOREIGN PATENT DOCUMENTS

CN 205622467 U 10/2016
CN 106655691 B 3/2018
(Continued)

OTHER PUBLICATIONS

Taiwanese Office Action for Taiwanese Application No. 113137601, dated Jan. 9, 2026, with English translation.

*Primary Examiner* — Thjuan K Addy
(74) *Attorney, Agent, or Firm* — Birch, Stewart, Kolasch & Birch, LLP

(57) ABSTRACT

The present invention discloses an electronic device, comprising: a case includes a containing tank. A weighting base is located in the containing tank, and the weighting base includes a weighting main body and a bearing plate assembled together. A motor coil is located on the bearing plate. A supporting plate is installed on the case, and the supporting plate is located on the motor coil. A magnetic unit is located on the supporting plate, the magnetic unit is located corresponding to the motor coil, and the magnetic unit is configured to act on the motor coil. A frame component is located on the case, and the frame component is located on the magnetic unit. A vibration component is located on the frame component. A voice coil is located under the vibration component and the voice coil extends downward into the magnetic unit.

20 Claims, 7 Drawing Sheets

(51) Int. Cl.
*H04R 1/28* (2006.01)
*H04R 9/04* (2006.01)
*H04R 9/06* (2006.01)

(52) U.S. Cl.
CPC ......... *H04R 9/063* (2013.01); *H04R 2400/03* (2013.01); *H04R 2499/11* (2013.01)

(58) Field of Classification Search
USPC ........................................ 381/412, 150, 396
See application file for complete search history.

(56) References Cited

FOREIGN PATENT DOCUMENTS

| | | | |
|---|---|---|---|
| CN | 114501256 | A | 5/2022 |
| CN | 218976829 | U | 5/2023 |
| CN | 116866795 | A | 10/2023 |
| CN | 117014774 | A | 11/2023 |
| CN | 117041832 | A | 11/2023 |
| CN | 117098042 | A | 11/2023 |
| TW | M664495 | U | 12/2024 |
| WO | WO 2016/179990 | A1 | 11/2016 |

* cited by examiner

ELECTRONIC DEVICE

CROSS REFERENCE TO RELATED APPLICATION

This application claims the priority benefit of Chinese Patent Application Serial Number 2024110465174, filed on Aug. 1, 2024, the full disclosure of which is incorporated herein by reference.

BACKGROUND OF THE INVENTION

1. Field of the Invention

The present invention relates to the technical field of handheld or wearable electronic devices, and more particularly, it relates to an electronic device that combines a speaker structure and a motor structure.

2. Description of the Related Art

Currently, the internal components used in smartphones and smartwatches, such as the speaker structure for sound playback and the motor structure for providing linear vibration, are independently designed. The speaker structure and motor structure are separately manufactured as individual parts, and the abovementioned speaker structure and motor structure are each installed into the electronic device through reasonable design. However, the disadvantage of these independently designed components is that it is hard to effectively reduce the internal space occupied by both the speaker and motor structures through optimal layout. This limitation restricts the structural arrangement of the internal space of the electronic device, thereby reducing the space available for other components and making it difficult to significantly improve the overall performance of the electronic device.

SUMMARY OF THE INVENTION

The present invention embodiment provides an electronic device that solves the issue of the internal space occupied by the speaker structure and motor structure, which in the prior art limits the structural layout of the internal space of the electronic device.

To solve the above technical problem, the present invention is implemented as follows:

An electronic device which is provided includes: a case, a weighting base, a motor coil, a supporting plate, a magnetic unit, a frame component, a vibration component and a voice coil. The case includes a containing tank. The weighting base is located in the containing tank, the weighting base includes a weighting main body and a bearing plate assembled together, and the motor coil is located on the bearing plate. The supporting plate is located on the case and located on the motor coil. The magnetic unit is located on the supporting plate, the magnetic unit is located corresponding to the motor coil, and the magnetic unit is configured to act on the motor coil. The frame component is located on the case and is located on the magnetic unit. The vibration component is located on the frame component, the voice coil is located under the vibration component, and the voice coil extends downward into the magnetic unit.

In one of the embodiments, the weighting main body is a hollow frame, and the bearing plate is located on the weighting main body.

In one of the embodiments, the case includes a convex part. The convex part is located at a bottom of the containing tank, the convex part protrudes into the weighting main body, and the convex part is located under the bearing plate.

In one of the embodiments, the electronic device further includes an auxiliary magnetic part. The auxiliary magnetic part is located at the bottom of the containing tank, the auxiliary magnetic part is located in the weighting main body, the auxiliary magnetic part is located under the bearing plate, the auxiliary magnetic part is located corresponding to the motor coil, and the auxiliary magnetic part is configured to act on the motor coil.

In one of the embodiments, the electronic device further includes two elastic units. The two elastic units are respectively located on two sides of the weighting base, and two ends of each of the two elastic units are respectively pressed against the case and the weighting base.

In one of the embodiments, the magnetic unit further includes two main magnetic parts and two secondary magnetic parts. The two main magnetic parts are located side by side on the supporting plate, the two main magnetic parts are corresponded to a top of the motor coil, and the two secondary magnetic parts are located on an outside of the two main magnetic parts.

In one of the embodiments, the supporting plate further includes a second hole, and the second hole is located between the two main magnetic parts.

In one of the embodiments, the frame component includes a first frame and a second frame. The second frame is fixed on the first frame, two opposite inner sides of the second frame include a fixing part, and the two fixing parts are located on the two secondary magnetic parts.

In one of the embodiments, a frame of the first frame includes a fixing notch, a frame of the second frame includes a fixing convex part, and the fixing convex part of the second frame is fixed by the fixing notch of the first frame.

In one of the embodiments, the electronic device further includes two magnetic conductive parts, and the two magnetic conductive parts are located on the two main magnetic parts.

In one of the embodiments, there are two voice coils. The two voice coils are located under the vibration component, the two voice coils pass through the frame component, and the two voice coils are corresponded to the two main magnetic parts.

In one of the embodiments, the electronic device further includes an outer cover. The outer cover includes a sound hole, the sound hole penetrates an inside and an outside of the outer cover, the outer cover is located on the frame component, the outer cover covers the vibration component, and the sound hole links to a space with the vibration component in the outer cover.

In one of the embodiments, the vibration component includes a sound film part and a central sticker. A peripheral side of the sound film part is located on the frame component, the sound film part is located around a peripheral side of the central sticker, the voice coil is located under the central sticker, and the voice coil is located on an inside of the sound film part.

In one of the embodiments, the electronic device further includes a first electrical unit. The first electrical unit is located on one side of the weighting base, one end of the first electrical unit is electrically connected to the motor coil, and the other end of the first electrical unit passes from an inside of the containing tank to an outside of the case.

In one of the embodiments, the bearing plate includes a first hole corresponded to a position of the motor coil, and an electrical connection wire of the first electrical unit can be electrically connected to the motor coil through the first hole.

In one of the embodiments, the electronic device further includes a second electrical unit. The second electrical unit is located on an inside of the frame component, one end of the second electrical unit is connected to the voice coil, and the other end of the second electrical unit passes from an inside of the containing tank to an outside of the case.

In one of the embodiments, the weighting main body of the weighting base is a rectangular outer frame, the middle of the weighting main body is a hollow area, the inner edge frame of the weighting main body includes a mounting notch, the bearing plate is correspondingly assembled to the mounting notch, and the bearing plate covers the hollow area.

The present invention provides an electronic device; via the structural design of the weighting base, which includes a weighting main body and a bearing plate, and via the hollow center of the weighting main body and installation of the bearing plate and motor coil within the weighting main body, the overall height of the weighting base can be reduced, allowing the electronic device to have a thinner overall appearance. At the same time, the motor coil, the magnetic unit, and the voice coil in the electronic device can be positioned closer to one another, allowing both the motor coil and the voice coil to receive sufficient magnetic field strength from the magnetic unit to enhance the performance of both the speaker and the vibration motor.

BRIEF DESCRIPTION OF THE DRAWINGS

The accompanying drawings described herein are provided to offer a further understanding of the present invention and form a part of the present invention. The illustrative embodiments of the present invention and their descriptions are intended to explain the present invention and do not constitute limitations on it. In the drawings.

Figure 1:
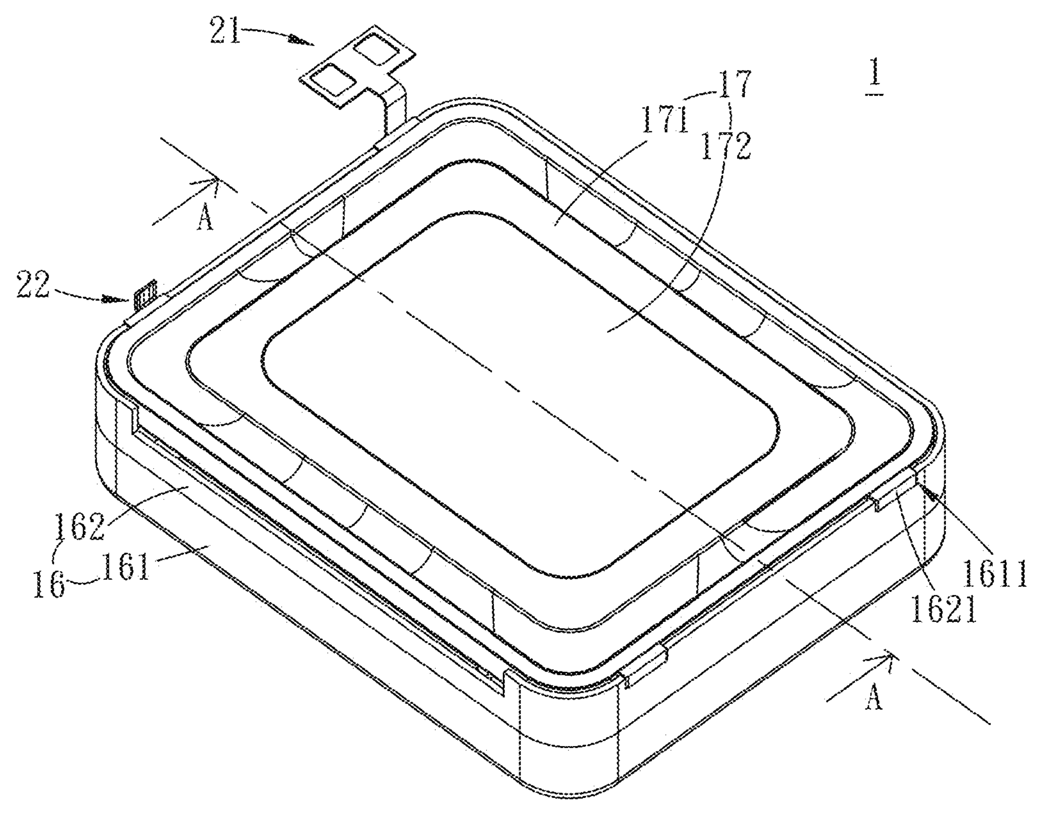
FIG. 1 is a perspective view of the electronic device of the first embodiment of the present invention.

The description in conjunction with the drawings is as follows:

1: electronic device; 11: case; 111: containing tank; 112: convex part; 12: weighting base; 121: weighting main body; 1210: hollow area; 1211: mounting notch; 122: bearing plate; 1221: first hole; 13: motor coil; 14: supporting plate; 141: second hole; 15: magnetic unit; 151: main magnetic part; 152: secondary magnetic part; 16: frame component; 161: first frame; 1611: fixing notch; 162: second frame; 1621: fixing convex part; 163: fixing part; 17: vibration component; 171: sound film part; 172: central sticker; 18: voice coil; 19: elastic unit; 20: magnetic conductive part; 21: first electrical unit; 22: second electrical unit; 23: outer cover; 231: sound hole; 24: auxiliary magnetic part.

DETAILED DESCRIPTION OF THE PREFERRED EMBODIMENT

The following will disclose multiple embodiments of the present invention using figures. For the purpose of clear explanation, many implementation details will be provided in the following descriptions. However, it should be understood that these implementation details should not be used to limit the present invention. In other words, in some embodiments of the present invention, these implementation details are not necessary. Additionally, for the sake of simplicity in the drawings, some commonly used structures and components will be illustrated in a simplified schematic manner. In the following embodiments, the same reference numerals will be used to denote the same or similar components.

Figure 2:
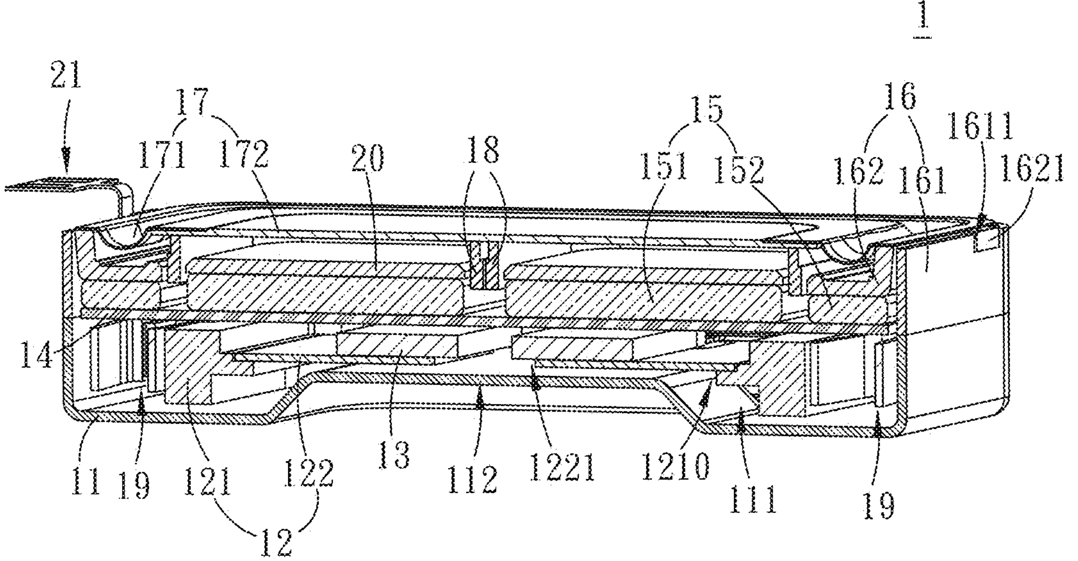
FIG. 2 is a cross-sectional view along line A-A' in FIG. 1.
Figure 3:
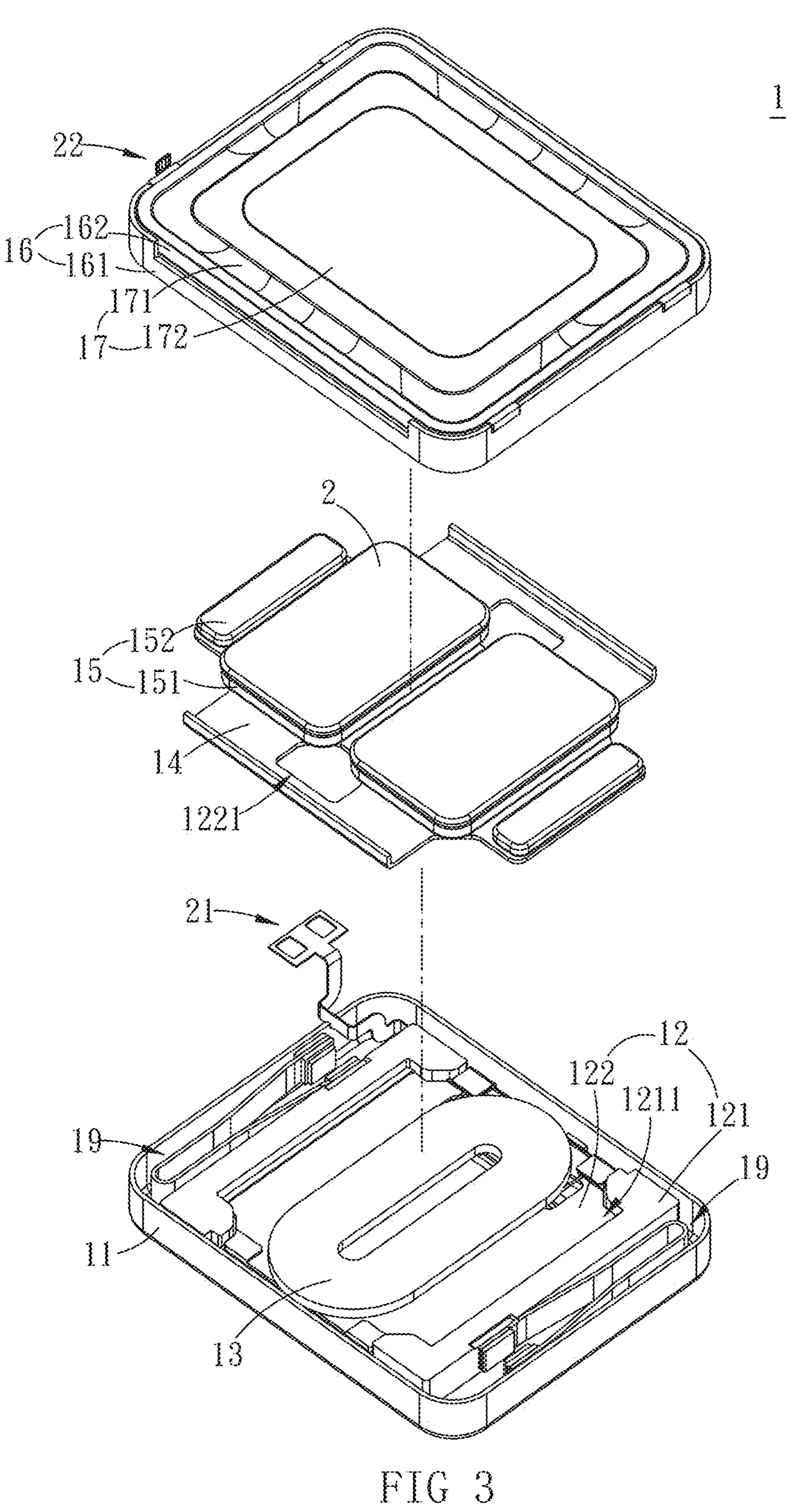
FIG. 3 is an exploded view of the electronic device of the first embodiment of the present invention.
Figure 4:
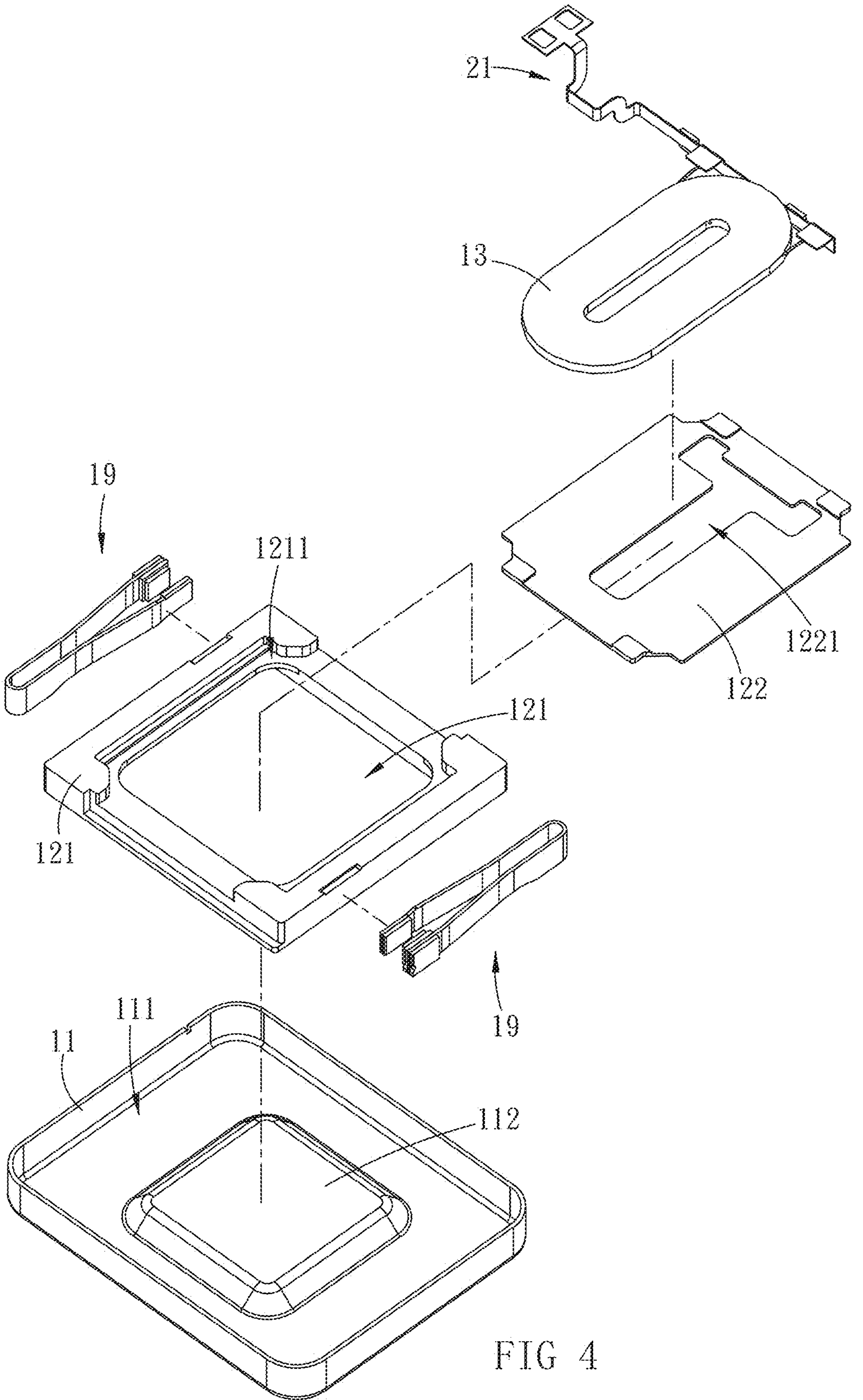
FIG. 4 is an exploded view of the lower half of the electronic device of the first embodiment of the present invention.
Figure 5:
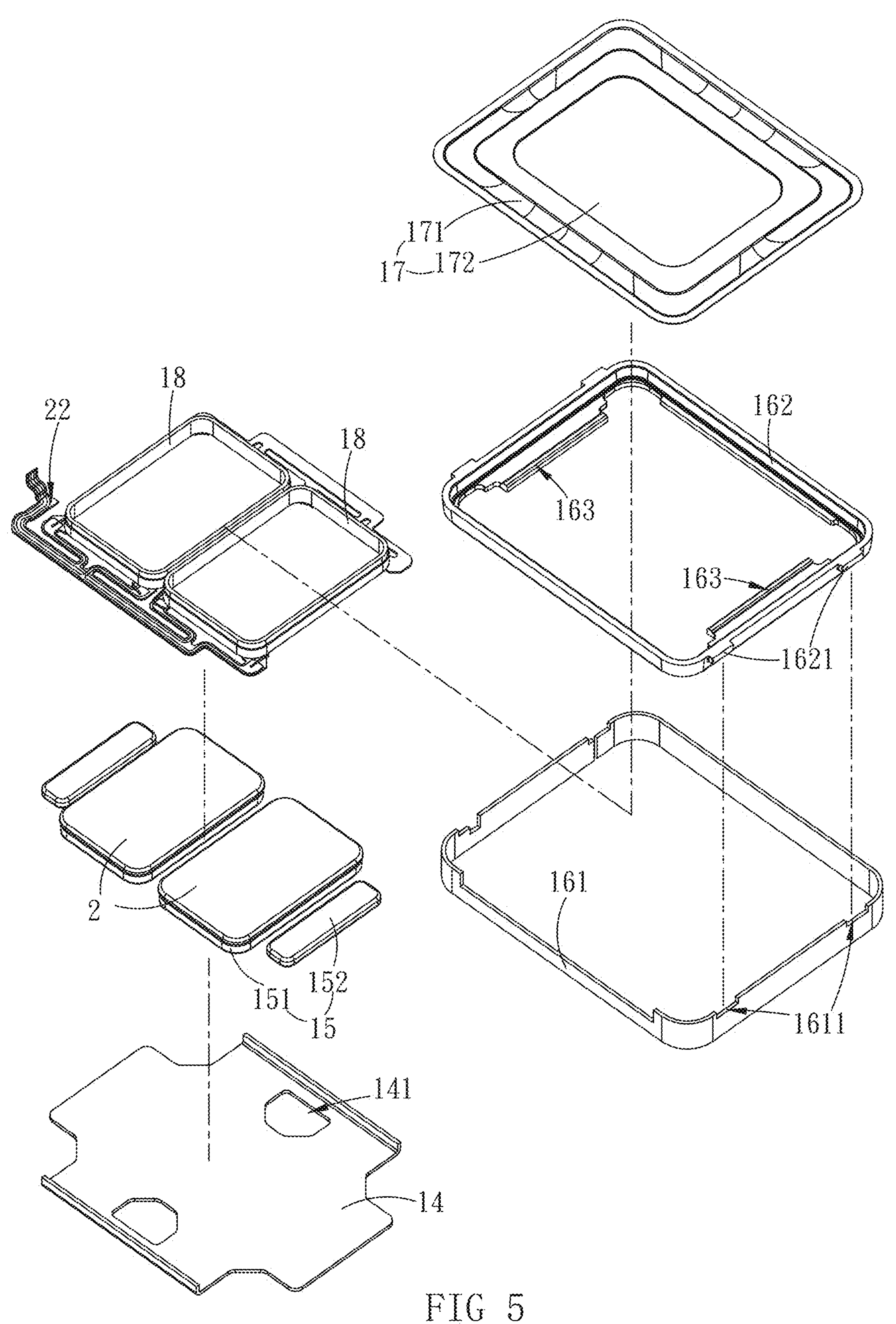
FIG. 5 is an exploded view of the upper half of the electronic device of the first embodiment of the present invention.

Please refer to FIG. 1 to FIG. 5. FIG. 1 is a perspective view of the electronic device of the first embodiment of the present invention, FIG. 2 is a cross-sectional view along line A-A' in FIG. 1, FIG. 3 is an exploded view of the electronic device, FIG. 4 is an exploded view of the lower half of the electronic device, and FIG. 5 is an exploded view of the upper half of the electronic device. As shown in the figures, the present invention provides an electronic device 1, which includes: a case 11, a weighting base 12, a motor coil 13, a supporting plate 14, a magnetic unit 15, a frame component 16, a vibration component 17, and a voice coil 18. The case 11 includes a containing tank 111. The weighting base 12 is located in the containing tank 111, and the weighting base 12 includes a weighting main body 121 and a bearing plate 122 which are assembled together. The motor coil 13 is located on the bearing plate 122. The supporting plate 14 is installed on the case 11, and the supporting plate 14 is located on the motor coil 13. The magnetic unit 15 is located on the supporting plate 14, the magnetic unit 15 is located corresponding to the motor coil 13, and the magnetic unit 15 is configured to act on the motor coil 13. The frame component 16 is installed on the case 11, and the frame component 16 is located above the magnetic unit 15. The vibration component 17 is located on the frame component 16. The voice coil 18 is located under the vibration component 17, the voice coil 18 is located in the frame component 16, and the voice coil 18 extends downward into the magnetic unit 15. The weighting base 12 is the center of gravity of the electronic device 1, which means that the weight of the weighting base 12 can be adjusted according to the user's needs.

In this embodiment, the weighting main body 121 is a hollow frame, and the bearing plate 122 is installed on the weighting main body 121; by setting the weighting main body 121 and the bearing plate 122 as separate components, the thickness of the bearing plate 122 is less than the thickness of the weighting main body 121; thus, this design allows more space to be reserved at the top and the bottom of the bearing plate 122. For example, the top of the bearing plate 122 can be used for accommodating motor coils 13 of different sizes, or/and the bottom of the bearing plate 122 can be used for accommodating magnetic structures that guide the motor coil 13. In comparison to a one-piece weighting base structure, this embodiment reduces the complexity of the manufacturing process for the weighting base.

Please refer again to FIG. 4. In this embodiment, the case 11 is made of a metal material, and the case 11 includes a containing tank 111 for housing the electronic components. The bottom of the case 11 includes a convex part 112, the convex part 112 is located in the middle of the bottom of the containing tank 111, and the convex part 112 protrudes in the direction toward the containing tank 111. The weighting main body 121 of the weighting base 12 is a rectangular outer frame, which means that the middle of the weighting main body 121 is a hollow area 1210. The inner edge of the weighting main body 121 includes a mounting notch 1211, the mounting notch 1211 matches the bearing plate 122, the bearing plate 122 is correspondingly assembled with the mounting notch 1211, and the bearing plate 122 covers the hollow area 1210. Thus, the mounting notch 1211 of the weighting main body 121 secures the position of the bearing plate 122 such that the bearing plate 122 is firmly fixed onto the weighting main body 121.

Additionally, the convex part 112 of the case 11 protrudes into the hollow area 1210 of the weighting main body 121, and the convex part 112 is located under the bearing plate 122. The convex part 112 of the case 11 can limit the range of lateral shaking of the weighting main body 121. The weighting base 12 is made of tungsten steel or other heavy materials and is used for stabilizing the operational state of the electronic device 1, such as during vertical vibration or lateral movement. Furthermore, the convex part 112 of the case 11 of this embodiment is made of a magnetic conductive material, and the convex part 112 is corresponded to the motor coil 13 such that the convex part 112 focuses the magnetic field on the motor coil 13. Do to the hollow center of the weighting main body 121 of the weighting base 12 and the installation of the bearing plate 122 and the motor coil 13 within the weighting main body 121, the height limitation of the weighting base 12 can be reduced; this allows the overall appearance of the electronic device 1 to be thinner, and the internal motor coil 13, the magnetic unit 15, and the voice coil 18 can be positioned closer to one another; thus, both the motor coil 13 and the voice coil 18 can receive sufficient magnetic field strength from the magnetic unit 15 to improve the performance of both the speaker and the vibration motor.

Furthermore, the electronic device 1 further includes two elastic units 19, the two elastic units 19 are respectively located on two sides of the weighting base 12, and the two ends of each of the elastic units 19 respectively press against the case 11 and the weighting main body 121 of the weighting base 12. Because the weighting base 12 is pressed by the elastic units 19 on two sides, the weighting base 12 remains centered within the containing tank 111 of the case 11. In this embodiment, the elastic unit 19 is a V-shaped or U-shaped bent structure, and the elastic unit 19 is made of a flexible metal material. When the weighting base 12 vibrates and presses against the elastic unit 19 on one side, the two ends of the elastic unit 19 are pushed closer to each other, and the elastic unit 19 will generate a reactive elastic restoring force due to the compression that pushes the weighting base 12 back to the center of the containing tank 111. The two ends of the elastic unit 19 on the other side are pulled apart such that the elastic unit 19 will generate a reactive elastic restoring force due to the tension to pull the weighting base 12 back to the center of the containing tank 111. This embodiment not only maintains the center of gravity of the weighting base 12 via its weight distribution but also uses the two elastic units 19 to buffer the displacement of the weighting base 12 caused by vibration.

Additionally, the electronic device 1 further includes a first electrical unit 21. The first electrical unit 21 is located on one side of the weighting base 12, one end of the first electrical unit 21 is electrically connected to the motor coil 13, and the other end of the first electrical unit 21 extends out of the case 11 from the containing tank 111 to electrically connect to an external power source. The motor coil 13 is located on the bearing plate 122. The bearing plate 122 includes a first hole 1221 at the location corresponding to the motor coil 13, and the electrical connection wire of the first electrical unit 21 can pass through the first hole 1221 to be electrically connected to the motor coil 13. The first hole 1221 of the bearing plate 122 of this embodiment is T-shaped. However, this embodiment does not restrict the shape of the first hole 1221, and it can be adjusted according to the user's requirements.

Please refer again to FIG. 5. In this embodiment, the supporting plate 14 is installed on the case 11 and is located above the motor coil 13. The magnetic unit 15 is located on the supporting plate 14, which means that the magnetic unit 15 is located above the motor coil 13. The magnetic unit 15 further includes two main magnetic parts 151 and two secondary magnetic parts 152. The two main magnetic parts 151 are located side by side on the supporting plate 14, the two main magnetic parts 151 are corresponded to the top of the area above the motor coil 13, and the two secondary magnetic parts 152 are located on the outside of the two main magnetic parts 151. The magnetic poles of the two main magnetic parts 151 are oppositely arranged, and the positions of these magnetic poles can be adjusted according to user requirements. The magnetic unit 15 is fixed to the bearing plate 122 with an adhesive. The magnetic poles of the two secondary magnetic parts 152 are also oppositely arranged relative to the main magnetic parts 151, thereby enhancing the intensity of the magnetic field. Furthermore, the electronic device 1 further includes two magnetic conductive parts 20. The two magnetic conductive parts 20 are located on the two main magnetic parts 151, and the two magnetic conductive parts 20 are used for guiding the magnetic lines to force and assist in concentrating the magnetic lines of the two main magnetic parts 151. Additionally, the supporting plate 14 further includes a second hole 141. The second hole 141 is located between the magnetic units 15, which means that the second hole 141 is not covered by the magnetic unit 15, and the electrical connection wire of the second electrical unit 22 can pass through the second hole 141 to be electrically connected to the voice coil 18. Meanwhile, the second hole 141 of the supporting plate 14 also allows for air circulation, which enables the voice coil 18 to produce sound through air vibrations.

Continuing from the above, the frame component 16 is made of plastic material, and the frame component 16 is located on the case 11. The frame component 16 includes a first frame 161 and a second frame 162, the second frame 162 is fixed to the first frame 161, each of the two opposite inner sides of the second frame 162 respectively includes a fixing part 163, and the two fixing parts 163 are located on the two secondary magnetic parts 152. The frame of the first frame 161 includes a fixing notch 1611, and the frame of the second frame 162 includes a fixing convex part 1621, and the fixing convex part 1621 is formed by injection molding. The fixing convex part 1621 of the second frame 162 fits securely into the fixing notch 1611 of the first frame 161, but this embodiment does not limit the assembly method of the first frame 161 and the second frame 162. Thus, the frame component 16 can also be used for fixing the two secondary magnetic parts 152. Additionally, the vibration component 17 includes a sound film part 171 and a central sticker 172. The peripheral side of the sound film part 171 is located on the second frame 162 of the frame component 16, the sound film part 171 is located around the peripheral side of the central sticker 172, the voice coil 18 is located under the central sticker 172, and the voice coil 18 is located inside the sound film part 171. In this embodiment, there are two voice coils 18. The two voice coils 18 are located under the vibration component 17, the two voice coils 18 pass through the frame component 16, and the two voice coils 18 are corresponded to the two main magnetic parts 151. In other words, the two voice coils 18 are respectively arranged around the two main magnetic parts 151.

Furthermore, the electronic device 1 further includes a second electrical unit 22, the second electrical unit 22 is located on the inside of the frame component 16, and the second electrical unit 22 is fixed between the first frame 161 and the second frame 162. One end of the second electrical unit 22 is connected to the two voice coils 18, and the other end of the second electrical unit 22 extends out of the case 11 from within the containing tank 111 to be electrically connected to an external power source. In this embodiment, the two voice coils are wound simultaneously with a single enameled wire, creating a series connection between the two voice coils 18, which reduces the number of soldering connections required for the two voice coils 18.

Figure 6:
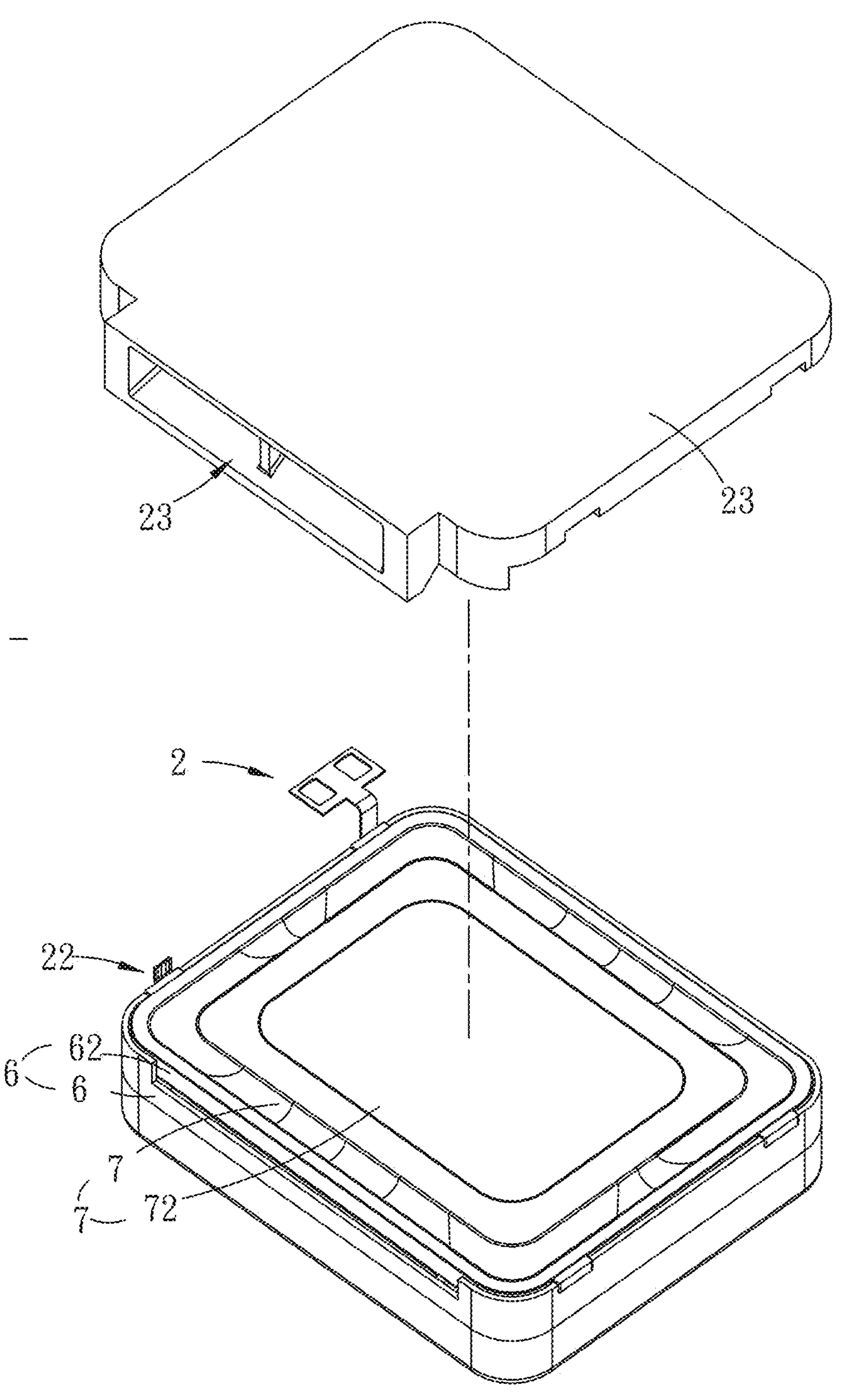
FIG. 6 is an exploded view of the outer cover of the electronic device of the present invention.

Please refer to FIG. 6, which is an exploded view of the outer cover of the electronic device of the present invention. As shown in the figure, in this embodiment, the electronic device 1 further includes an outer cover 23. The outer cover 23 includes a sound hole 231, the sound hole 231 penetrates the inside and the outside of the outer cover 23, the outer cover 23 is located on the frame component 16, the outer cover 23 covers the vibration component 17, and the sound hole 231 links to the space with the vibration component 17 in the outer cover 23. The outer cover 23 covers the open space above the vibration component 17 such that the sound generated by the vibration of the vibration component 17 and the voice coil 18 can be concentrated and transmitted within the enclosed space of the outer cover 23 for resonance, and then the sound is emitted through the sound hole 231.

Please also refer again to FIG. 1 to FIG. 5. In this embodiment, the electronic device 1 introduces power to the motor coil 13 via the other end of the first electrical unit 21, and the motor coil 13 interacts with the magnetic unit 15 to generate the linear motor vibration. The convex part 112 of the case 11 focuses the magnetic force on the motor coil 13 to enhance the performance of the motor coil 13. Furthermore, the motor coil 13 acts on the weighting base 12 to produce left and right linear displacement, producing a vibration state in the electronic device 1, and the two elastic units 19 act as buffering structures for the displacement. Furthermore, the electronic device 1 introduces power to the voice coil 18 via the other end of the second electrical unit 22, the voice coil 18 interacts with the magnetic unit 15, and the voice coil 18 causes the sound film part 171 and central sticker 172 of the vibration component 17 to produce sound; after being concentrated and resonated within the outer cover 23, the sound is emitted through the sound hole 231.

Figures 7, 8:
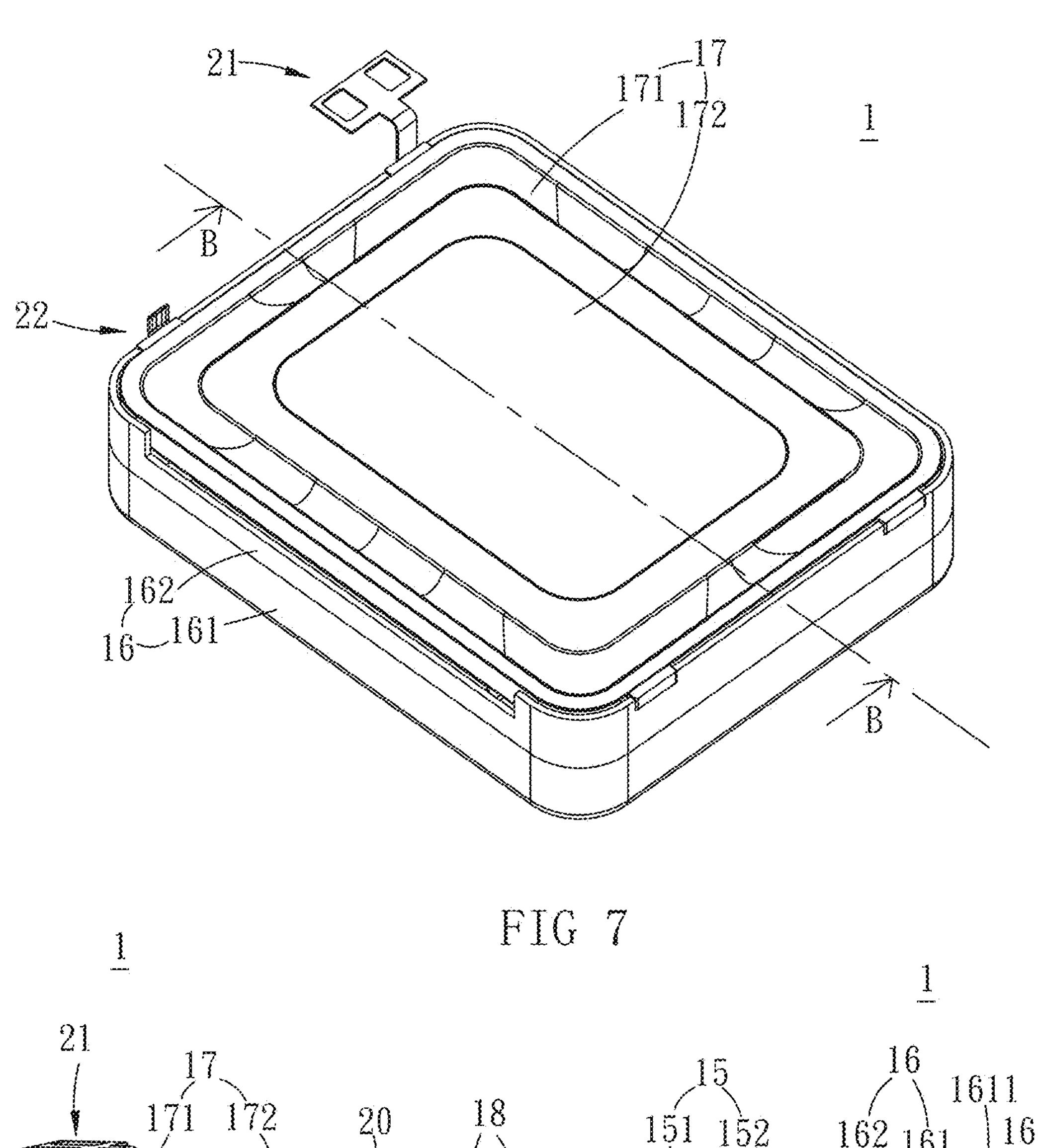
FIG. 7 is a perspective view of the electronic device of the second embodiment of the present invention.
FIG. 8 is a cross-sectional view along line B-B' in FIG. 7.
Figure 9:
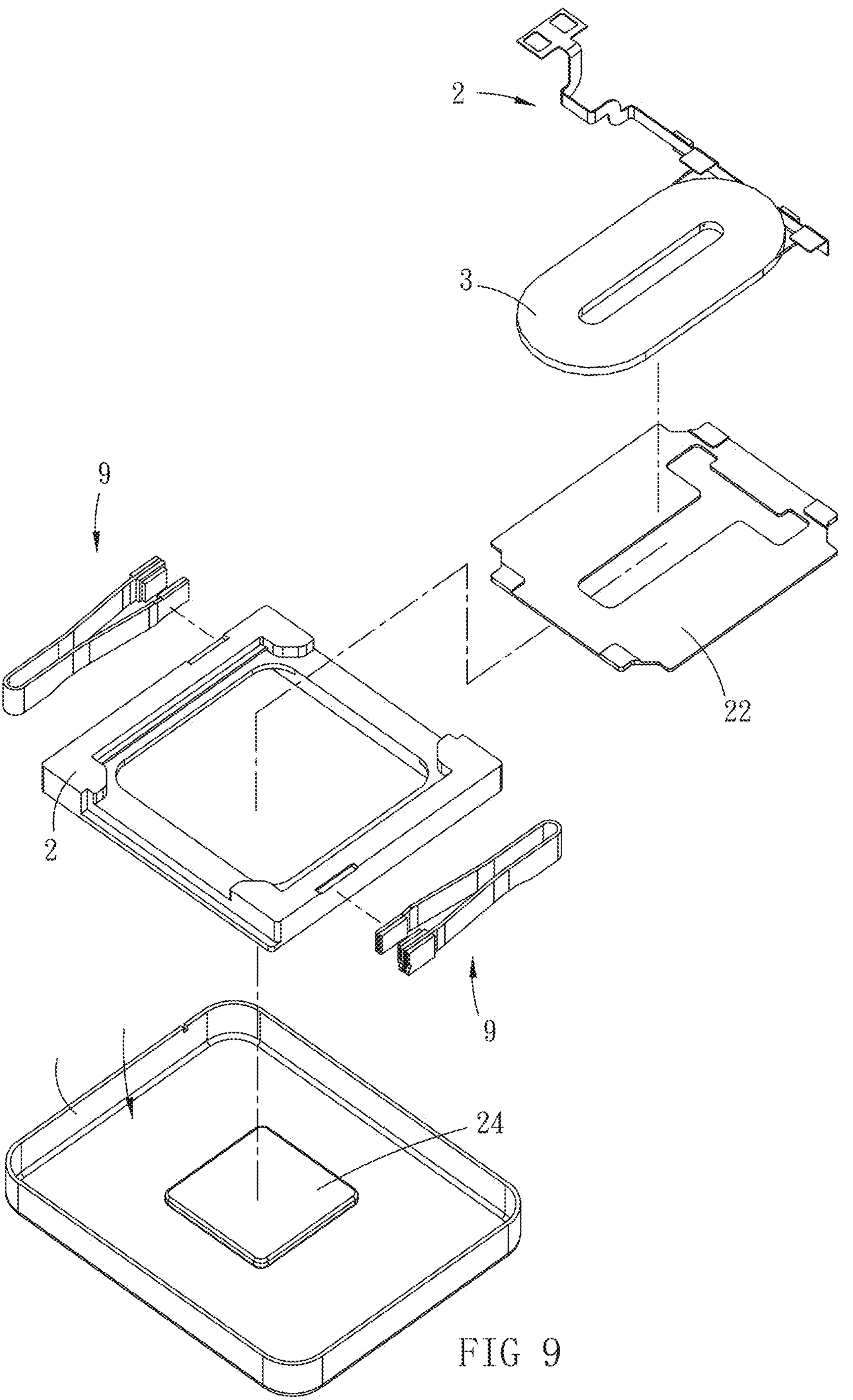
FIG. 9 is an exploded view of the lower half of the electronic device of the second embodiment of the present invention.

Please refer to FIG. 7 to FIG. 9. FIG. 7 is a perspective view of the electronic device of the second embodiment of the present invention, FIG. 8 is a cross-sectional view along line B-B' in FIG. 7, and FIG. 9 is an exploded view of the lower half of the electronic device. As shown in the figures, the difference between this embodiment and the first embodiment is the structure of the bottom of the containing tank 111 of the case 11. In this embodiment, the electronic device 1 further includes an auxiliary magnetic part 24. The auxiliary magnetic part 24 is located at the bottom of the containing tank 111, the auxiliary magnetic part 24 is in the weighting main body 121, the auxiliary magnetic part 24 is located under the bearing plate 122, the auxiliary magnetic part 24 is located corresponding to the motor coil 13, and the auxiliary magnetic part 24 is configured to interact with the motor coil 13. The auxiliary magnetic part 24 is used for helping the motor coil 13 receive sufficient magnetic field strength, thereby improving the performance of the vibration motor.

In summary, the present invention provides an electronic device with a structural design of the weighting base, and the weighting base includes a weighting main body and a bearing plate, wherein the weighting main body of the weighting base is hollow in the middle, and the bearing plate and motor coil are installed in the weighting main body such that the overall height of the weighting base can be reduced, allowing the electronic device to have a thinner overall appearance. Additionally, the motor coil, the magnetic unit, and the voice coil in the electronic device can be positioned closer to one another, enabling both the motor coil and voice coil to receive sufficient magnetic field strength from the magnetic unit and thus improving the performance of both the speaker and the vibration motor.

It should also be noted that the terms "comprise," "include," or any other variations thereof are intended to encompass non-exclusive inclusion such that a process, method, product, or device that includes a set of elements not only includes those elements but may also include other elements that are not explicitly listed or elements that are inherent to such a process, method, product, or device. Unless further restricted, an element defined by the phrase "comprises a . . . " does not exclude the existence of additional identical elements in the process, method, product, or device that includes the element.

The foregoing description illustrates and describes several preferred embodiments of the present invention. However, as mentioned above, it should be understood that the present invention is not limited to the forms disclosed herein and should not be viewed as excluding other embodiments. It may be applied in various other combinations, modifications, and environments, and changes can be made within the scope of the inventive concept described herein, based on the above teachings or the technical knowledge in the relevant field. Any changes and variations made by those skilled in the art without departing from the spirit and scope of the present invention are intended to fall within the protection scope of the appended claims of the present invention.

What is claimed is:

1. An electronic device, comprising: a case, comprising a containing tank; a weighting base, located in the containing tank, wherein the weighting base comprises a weighting main body and a bearing plate assembled together; a motor coil, located on the bearing plate; a supporting plate, installed on the case, wherein the supporting plate is located on the motor coil; a magnetic unit, located on the supporting plate, wherein the magnetic unit is located corresponding to the motor coil, and the magnetic unit is configured to act on the motor coil; a frame component, located on the case, wherein the frame component is located on the magnetic unit; a vibration component, located the frame component, and a voice coil, located under the vibration component, wherein the voice coil extends downward into the magnetic unit.

2. The electronic device as claimed in claim 1, the weighting main body is a hollow frame, and the bearing plate is located on the weighting main body.

3. The electronic device as claimed in claim 2, the case comprises a convex part, the convex part is located at a bottom of the containing tank, the convex part protrudes into the weighting main body, and the convex part is located under the bearing plate.

4. The electronic device as claimed in claim 2, further comprising an auxiliary magnetic part, wherein the auxiliary magnetic part is located at the bottom of the containing tank, the auxiliary magnetic part is located in the weighting main body, the auxiliary magnetic part is located under the bearing plate, the auxiliary magnetic part is located corresponding to the motor coil, and the auxiliary magnetic part is configured to act on the motor coil.

5. The electronic device as claimed in claim 3, further comprising two elastic units, the two elastic units are respectively located on two sides of the weighting base, and two ends of each of the two elastic units are respectively pressed against the case and the weighting base.

6. The electronic device as claimed in claim 4, further comprising two elastic units, the two elastic units are respectively located on two sides of the weighting base, and two ends of each of the two elastic units are respectively pressed against the case and the weighting base.

7. The electronic device as claimed in claim 3, wherein the magnetic unit further comprises two main magnetic parts and two secondary magnetic parts, the two main magnetic parts are located side by side on the supporting plate, the two main magnetic parts are corresponded to a top of the motor coil, and the two secondary magnetic parts are located on an outside of the two main magnetic parts.

8. The electronic device as claimed in claim 4, wherein the magnetic unit further comprises two main magnetic parts and two secondary magnetic parts, the two main magnetic parts are located side by side on the supporting plate, the two main magnetic parts are corresponded to a top of the motor coil, and the two secondary magnetic parts are located on an outside of the two main magnetic parts.

9. The electronic device as claimed in claim 7, wherein the supporting plate further comprises a second hole, and the second hole is located between the two main magnetic parts.

10. The electronic device as claimed in claim 7, wherein the frame component comprises a first frame and a second frame, the second frame is fixed on the first frame, two opposite inner sides of the second frame each comprise a fixing part, and the two fixing parts are located on the two secondary magnetic parts.

11. The electronic device as claimed in claim 10, wherein a frame of the first frame comprises a fixing notch, a frame of the second frame comprises a fixing convex part, and the fixing convex part of the second frame is fixed to the fixing notch of the first frame.

12. The electronic device as claimed in claim 7, further comprising two magnetic conductive parts, and the two magnetic conductive parts are located on the two main magnetic parts.

13. The electronic device as claimed in claim 7, wherein there are two voice coils, the two voice coils are located under the vibration component, the two voice coils pass through the frame component, and the two voice coils are corresponded to the two main magnetic parts.

14. The electronic device as claimed in claim 3, further comprising an outer cover, wherein the outer cover comprises a sound hole, the sound hole penetrates an inside and an outside of the outer cover, the outer cover is located on the frame component, the outer cover covers the vibration component, and the sound hole links to a space with the vibration component in the outer cover.

15. The electronic device as claimed in claim 3, wherein the vibration component comprises a sound film part and a central sticker, a peripheral side of the sound film part is located on the frame component, the sound film part is located around a peripheral side of the central sticker, the voice coil is located under the central sticker, and the voice coil is located on an inside of the sound film part.

16. The electronic device as claimed in claim 3, further comprising a first electrical unit, wherein the first electrical unit is located on one side of the weighting base, one end of the first electrical unit is electrically connected to the motor coil, and the other end of the first electrical unit passes from an inside of the containing tank to an outside of the case.

17. The electronic device as claimed in claim 16, wherein the bearing plate comprises a first hole corresponded to a position of the motor coil, and an electrical connection wire of the first electrical unit can be electrically connected to the motor coil through the first hole.

18. The electronic device as claimed in claim 3, further comprising a second electrical unit, wherein the second electrical unit is located on an inside of the frame component, one end of the second electrical unit is connected to the voice coil, and the other end of the second electrical unit passes from an inside of the containing tank to an outside of the case.

19. The electronic device as claimed in claim 3, the weighting main body of the weighting base is a rectangular outer frame, a middle of the weighting main body is a hollow area, an inner edge frame of the weighting main body comprises a mounting notch, the bearing plate is correspondingly assembled to the mounting notch, and the bearing plate covers the hollow area.

20. The electronic device as claimed in claim 4, the weighting main body of the weighting base is a rectangular outer frame, a middle of the weighting main body is a hollow area, an inner edge frame of the weighting main body comprises a mounting notch, the bearing plate is correspondingly assembled to the mounting notch, and the bearing plate covers the hollow area.

* * * * *